United States Patent
Stevens et al.

(10) Patent No.: US 9,444,270 B2
(45) Date of Patent: Sep. 13, 2016

(54) WIRELESS POWER TRANSFER

(75) Inventors: Gregory Louis Stevens, Scotts Valley, CA (US); Rongzhi Xing, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 1059 days.

(21) Appl. No.: 13/565,429

(22) Filed: Aug. 2, 2012

(65) Prior Publication Data

US 2014/0035379 A1 Feb. 6, 2014

(51) Int. Cl.
H02J 7/00 (2006.01)
H02J 7/02 (2016.01)

(52) U.S. Cl.
CPC .............. *H02J 7/0013* (2013.01); *H02J 7/025* (2013.01)

(58) Field of Classification Search
CPC ........... H02J 7/0013; H02J 7/025; H02J 1/00
USPC ........................................ 301/104; 307/104
See application file for complete search history.

(56) References Cited

U.S. PATENT DOCUMENTS

| 2008/0315826 | A1* | 12/2008 | Alberth, Jr. | ........... | H02J 7/0013 320/101 |
| 2009/0096413 | A1 | 4/2009 | Partovi et al. | | |
| 2010/0171461 | A1* | 7/2010 | Baarman | ................. | H02J 5/005 320/108 |
| 2011/0006603 | A1* | 1/2011 | Robinson | ................ | G06F 1/263 307/31 |
| 2011/0050164 | A1 | 3/2011 | Partovi et al. | | |
| 2011/0175461 | A1 | 7/2011 | Tinaphong | | |
| 2011/0241607 | A1 | 10/2011 | Wiegers | | |
| 2011/0244794 | A1 | 10/2011 | Nakano | | |
| 2011/0285349 | A1 | 11/2011 | Widmer et al. | | |
| 2012/0009869 | A1* | 1/2012 | Suzuki et al. | ................ | 455/41.1 |
| 2012/0025760 | A1 | 2/2012 | Uramoto et al. | | |
| 2012/0169291 | A1* | 7/2012 | Abe | ...................... | H01M 10/44 320/134 |
| 2013/0249305 | A1 | 9/2013 | Kudo et al. | | |

FOREIGN PATENT DOCUMENTS

| EP | 2273650 | A2 | 1/2011 |
| EP | 2426004 | A2 | 3/2012 |
| EP | 2557652 | A1 | 2/2013 |
| EP | 2670017 | A2 | 12/2013 |
| JP | 2007089341 | A * | 4/2007 |

OTHER PUBLICATIONS

International Preliminary Report on Patentability for International Application No. PCT/US2013/049692, issued Feb. 3, 2015, 8 pages.

(Continued)

*Primary Examiner* — Kenneth B Wells
*Assistant Examiner* — James P Evans
(74) *Attorney, Agent, or Firm* — Toler Law Group, PC

(57) ABSTRACT

Systems and methods are disclosed that enable power regulation during wireless power transfer, such as during magnetic resonance (MR) charging of one or more devices from a power transfer device, by applying a cascading charging mechanism that includes identifying a priority order of charging of each of the one or more devices to allocate wirelessly transmitted power to the one or more devices.

20 Claims, 7 Drawing Sheets

(56) References Cited

OTHER PUBLICATIONS

International Search Report and Written Opinion of the International Searching Authority (EPO) for International Application No. PCT/US2013/049692, mailed Jul. 7, 2014, 12 pages.

Cooper, Daniel "D-Link's All in One Mobile Companion Is Gonna Lighten the Load of Your Checked Baggage," http://www.engadget.com/2012/01/10/d-link-all-in-one-mobile-companion/, Jan. 10, 2012, 6 pages.

\* cited by examiner

WIRELESS POWER TRANSFER

FIELD OF THE DISCLOSURE

The present disclosure is generally related to wireless power transfer to devices.

BACKGROUND

Wireless charging systems allow powering and charging of portable devices by using energy from electrical or magnetic fields in proximity to the portable devices instead of providing power via a wired connection. Wireless charging may be used in various applications including electric tooth brushes, mobile phones, televisions, cars, etc. In these applications, typically a single transmitter is used to charge a single receiver. Such a one-to-one relationship may be imposed due to limitations of magnetic induction (MI) technology. For example, a multi-device charging mat that uses MI technology includes several transmitters to support several receivers of devices that are placed on the mat, so that a one-to-one relationship between transmitters and receivers is maintained. Wireless charging using magnetic resonance (MR) technology enables multiple receiver devices positioned in proximity to the transmitter to be charged simultaneously.

SUMMARY

Multi-device wireless power transfer from a transmitter using magnetic resonance is regulated by applying a cascading charging mechanism to allocate wirelessly transmitted power to one or more wireless devices. The cascading charging mechanism may identify a priority order of charging of each of the one or more wireless devices. Based on the priority order, the cascading charging mechanism may select a highest priority wireless device, determine an amount of remaining power, and assign a percentage of the remaining power to the highest priority wireless device. The cascading charging mechanism may thereafter select a next highest priority wireless device, determine the amount of remaining power, and assign the same percentage of the remaining power to the next highest priority wireless device. A lowest priority wireless device may be assigned a remaining percentage of the remaining power after power allocation to higher priority devices.

DETAILED DESCRIPTION

Systems and methods are disclosed that enable power regulation during wireless power transfer, such as during magnetic resonance (MR) charging of one or more devices from a power transfer device, by applying a cascading charging mechanism that includes identifying a priority order of charging of each of the one or more devices to allocate wirelessly transmitted power to the one or more devices.

Figure 1:
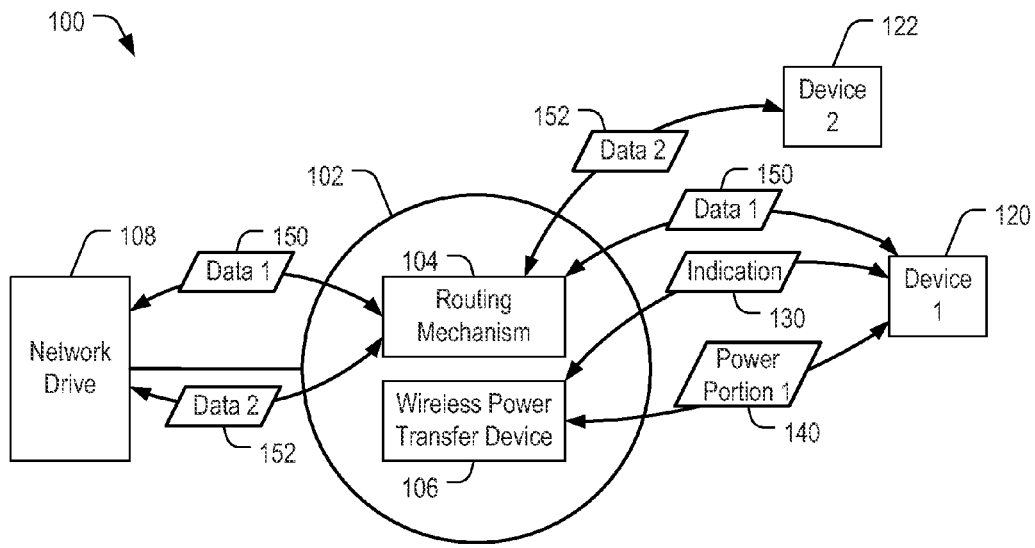
FIG. 1 is a block diagram of a first illustrative embodiment of a system including a power transfer device and a routing mechanism.

Referring to FIG. 1, a particular illustrative embodiment of a system to wirelessly transfer power to one or more wireless devices is depicted and generally designated 100. The system 100 includes an apparatus 102 operatively coupled to a network drive 108. The network drive 108 may be a memory device that is accessible to one or more other devices via a network, such as a network supported by the apparatus 102. For example, the network drive 108 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the network drive 108 may be embedded memory in the apparatus 102, such as eMMC® (trademark of JEDEC Solid State Technology Association, Arlington, Va.) and eSD memory, as illustrative examples. The network drive 108 may be removably coupleable to the apparatus 102 and may include a flash network device. Although the network drive 108 is illustrated as being external to the apparatus 102, in other implementations, the network drive 108 may be within the apparatus 102, such as described in further detail with respect to FIG. 4.

The apparatus 102 includes a routing mechanism 104 and a wireless power transfer device 106. A first wireless device 120 is wirelessly coupled to the apparatus 102 via the routing mechanism 104. The first wireless device 120 is also wirelessly coupled to the apparatus 102 via the wireless power transfer device 106. A second wireless device 122 is wirelessly coupled to the apparatus 102 via the routing mechanism 104. The second wireless device 122 may also be coupled to the apparatus 102 via the wireless power transfer device 106. Each of the first wireless device 120 and the second wireless device 122 may include a mobile telephone, an audio or video player, a gaming console, an electronic book reader, a personal digital assistant (PDA), a computer such as a laptop computer, a notebook computer, or a tablet, an electronic device, or any combination thereof.

The wireless power transfer device 106 is configured to receive, wirelessly, from the first wireless device 120, an indication 130 of a power receiving state of the first wireless device 120, and to determine whether the power receiving state of the first wireless device 120 is at or below a threshold. For example, the indication 130 may correspond to a percentage of battery charge. Alternatively, the wireless power transfer device 106 may be configured to receive, wirelessly, from the first wireless device 120, an indication of whether the power receiving state of the first wireless device 120 is at or below the threshold. For example, the first wireless device 120 may be configured to compare its percentage of battery charge to the threshold and to send the indication of whether the power receiving state of the first wireless device 120 is at or below the threshold to the wireless power transfer device 106. In response to the power receiving state being at or below the threshold, the wireless power transfer device 106 is configured to transmit a portion 140 of available power of the wireless power transfer device 106 to the first wireless device 120. The wireless power transfer device 106 may be configured to transmit the portion 140 of available power via magnetic resonance (MR).

For example, the power receiving state of the first wireless device 120 may correspond to a percentage of battery charge, and the threshold may correspond to a value of the percentage of battery charge. The threshold may be a design parameter or may be user defined. If the value of the percentage of battery charge of the first wireless device 120 is at or below a threshold amount (e.g., 90% for purposes of illustration), the wireless power transfer device 106 will transmit the portion 140 of available power of the wireless power transfer device 106 to the first wireless device 120. If the value of the percentage of battery charge of the first wireless device 120 is above the threshold amount (e.g., 90%), the wireless power transfer device 106 may not transmit the portion 140 of available power of the wireless power transfer device 106 to the first wireless device 120. Similarly, the wireless power transfer device 106 may be configured to transmit a second portion of available power of the wireless power transfer device 106 to the second wireless device 122 as described in further detail with respect to FIG. 2.

The routing mechanism 104 may support network address translation and is configured to enable wireless access by the first wireless device 120 to the network drive 108. For example, while the apparatus 102 is operatively coupled to the network drive 108, the routing mechanism 104 enables access by the first wireless device 120 to the network drive 108 via wireless communication between the first wireless device 120 and the routing mechanism 104. As another example, while the apparatus 102 is operatively coupled to the network drive 108, the routing mechanism 104 may enable access by the first wireless device 120 to the network drive 108 via wireless communication between the first wireless device 120 and the routing mechanism 104 during wireless power transfer from the wireless power transfer device 106 to the first wireless device 120. Similarly, while the apparatus 102 is operatively coupled to the network drive 108, the routing mechanism 104 enables access by the second wireless device 122 to the network drive 108 via wireless communication between the second wireless device 122 and the routing mechanism 104.

While the apparatus 102 is operatively coupled to the network drive 108, one or more wireless devices may be able to synchronize data on the network drive 108 via the routing mechanism 104. For example, the data on the network drive 108 may correspond to one or more applications or data usable by applications, such as a music library, a collection of photographs, etc. The apparatus 102 may be coupled to a personal computer that has internet access such that an audio file library, a video file library, or any combination thereof, may be maintained via a client application at the personal computer. An audio library, a video library, or any combination thereof, may be maintained at the network drive 108. The routing mechanism 104 may enable synchronization of one or more of the first wireless device 120 and the second wireless device 122 with respect to the audio library, the video library, or any combination thereof, at the network drive 108 via wireless communication between the first wireless device 120 and the routing mechanism 104.

As another example, while the apparatus 102 is operatively coupled to the network drive 108, data on the network drive 108 may be available to be accessed by multiple devices via the routing mechanism 104 to enable synchronization of the data among the multiple devices. For example, first data 150 on the network drive 108 may be available to be accessed by the first wireless device 120 via the routing mechanism 104, and second data 152 may be available to be accessed by the second wireless device 122 via the routing mechanism 104. The routing mechanism 104 may enable synchronization of the first data 150 and the second data 152 among the first wireless device 120 and the second wireless device 122. To illustrate, the routing mechanism 104 enables access by the first wireless device 120 to the first data 150 and to the second data 152 on the network drive 108 via wireless communication between the first wireless device 120 and the routing mechanism 104, and enables access by the second wireless device 122 to the first data 150 and to the second data 152 on the network drive 108 via wireless communication between the second wireless device 122 and the routing mechanism 104.

During operation, the wireless power transfer device 106 may wirelessly receive, from the first wireless device 120, the indication 130 of the power receiving state of the first wireless device 120, and determine whether the power receiving state of the first wireless device 120 is at or below the threshold. In response to the power receiving state being at or below the threshold, the wireless power transfer device 106 may transmit the first portion 140 of available power of the wireless power transfer device 106 to the first wireless device 120. While the apparatus 102 is operatively coupled to the network drive 108, the routing mechanism 104 may enable access by the first wireless device 120 to the first data 150 on the network drive 108 via wireless communication between the first wireless device 120 and the routing mechanism 104, such as to enable synchronization of the first data 150 with the first wireless device 120. The routing mechanism 104 may enable access by the first wireless device 120 to the first data 150 on the network drive 108 during wireless power transfer from the wireless power transfer device 106 to the first wireless device 120. Similarly, the routing mechanism 104 may enable access by the second wireless device 122 to the second data 152 on the network drive 108 via wireless communication between the second wireless device 122 and the routing mechanism 104.

Although the wireless power transfer device 106 is described with respect to FIG. 1 as being configured to transmit a portion of available power of the wireless power transfer device 106 to the first wireless device 120 in response to the power receiving state being at or below the threshold for ease of explanation, in an alternate implementation, the threshold may be satisfied if the power receiving state is at or above the threshold. Alternatively, or in addition, the threshold may be satisfied if the power receiving state is below the threshold, or if the power receiving state is above the threshold.

Enabling one or more wireless devices to wirelessly charge from a power transfer device while enabling the one or more wireless devices to concurrently communicate data to and/or receive data from a network drive via a routing mechanism enables data to be synchronized between the network drive and a particular device and/or among multiple devices while the multiple devices are charging, may enhance a user experience of a user of one or more of the wireless devices.

Although enabling data to be synchronized between the network drive and the one or more wireless devices during wireless device charging may enhance the user experience, wireless device charging may occur without concurrently communicating data to and/or receiving data from the network drive. Similarly, communicating data to and/or receiving data from the network drive may occur without wireless device charging.

Figure 2:
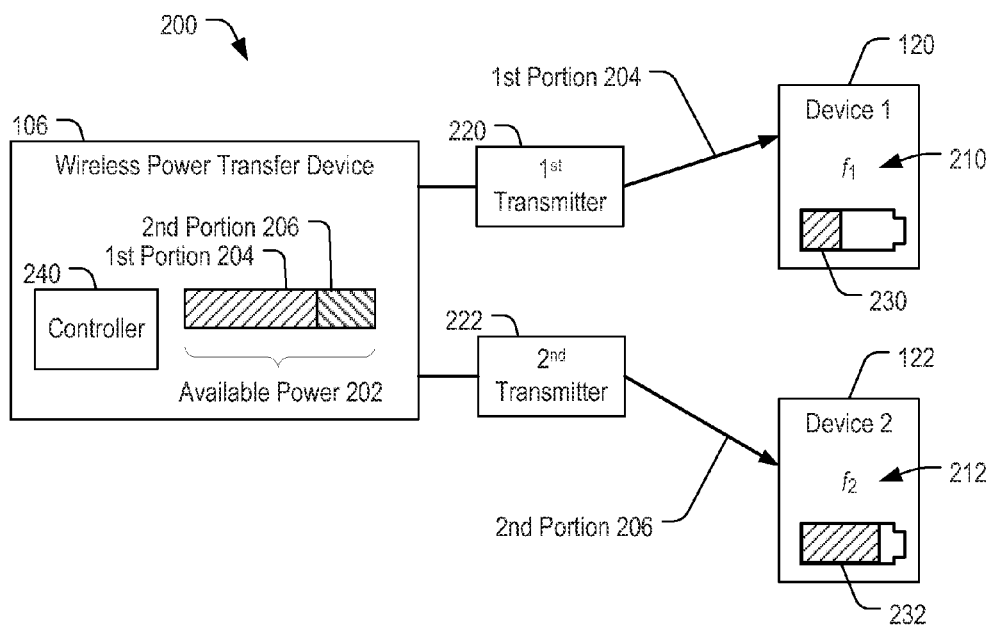
FIG. 2 is a block diagram illustrating an example of allocation of portions of available power and transmission of the portions of available power of the power transfer device of FIG. 1 to multiple wireless devices.

Referring to FIG. 2, a particular illustrative embodiment of the power transfer device 106 of FIG. 1 showing additional detail of system components is depicted and generally designated 200. The system 200 includes the wireless power transfer device 106 coupled to (e.g., in wireless communication with) the first wireless device 120 and coupled to (e.g., in wireless communication with) the second wireless device 122.

The wireless power transfer device 106 includes a controller 240. The controller 240 is configured to be coupled to a transmitter, such as a first power transfer device transmitter 220 coupled to the first wireless device 120 and a second power transfer device transmitter 222 coupled to the second wireless device 122. Although the transmitter is illustrated as including the first and second power transfer device transmitters 220, 222, in other implementations, the transmitter may include fewer than two power transfer device transmitters or more than two power transfer device transmitters.

The controller 240 is configured to cause transmission of a portion of available power 202 of the wireless power transfer device 106 to the first wireless device 120. Causing transmission of the portion of the available power 202 of the wireless power transfer device 106 may include allocating the available power 202 into portions of available power to enable wireless power transfer to the first wireless device 120 and to the second wireless device 122 while the first wireless device 120 and/or the second wireless device 122 accesses the network drive 108 of FIG. 1.

As illustrated, the available power 202 may be allocated into a first portion 204 and into a second portion 206. The first portion 204 may be less than the second portion 206, equal to the second portion 206, or greater than the second portion 206. Although the available power 202 is illustrated as being allocated into the first and second portions 204, 206, in other implementations, the available power 202 may be allocated into one portion or more than two portions. For example, the available power 202 may be allocated into portions based at least in part on multiple wireless devices being in proximity to the wireless power transfer device 106 and based on a number of indications received by the wireless power transfer device 106 from the multiple wireless devices described above with respect to FIG. 1.

For example, the power receiving state of the first wireless device 120 may include a first percentage of battery charge 230 and the power receiving state of the second wireless device 122 may include a second percentage of battery charge 232. If the wireless power transfer device 106 determines that the power receiving state (e.g., the first percentage of battery charge 230) of the first wireless device 120 is at or below the threshold and the wireless power transfer device 106 determines that the power receiving state (e.g., the second percentage of battery charge 232) of the second wireless device 122 is at or below the threshold, then the available power 202 may be allocated into two portions. As another example, if the wireless power transfer device 106 determines that the power receiving state of each of the first wireless device 120, the second wireless device 122, and a third wireless device (not shown) is at or below the threshold, then the available power 202 may be allocated into three portions.

Allocating the available power 202 into the first portion 204 may include tuning the first power transfer device transmitter 220 to match a first frequency 210 of the first wireless device 120. Similarly, allocating the available power 202 into the second portion 206 may include tuning the second power transfer device transmitter 222 to match a second frequency 212 of the second wireless device 122. For example, the controller 240 may be configured to tune the first power transfer device transmitter 220 to match the first frequency 210 of the first wireless device 120 and may be configured to tune the second power transfer device transmitter 222 to match the second frequency 212 of the second wireless device 122. The first frequency 210 and the second frequency 212 may be the same. Alternatively, the first frequency 210 and the second frequency 212 may be different. When allocating the available power into the first portion 204 and the second portion 206, the controller 240 may be configured to control current to each of the first power transfer device transmitter 220 and the second power transfer device transmitter 222.

During operation, the wireless power transfer device 106 may receive, wirelessly, from the first wireless device 120, a first indication of the power receiving state (e.g., the first percentage of battery charge 230) of the first wireless device 120 and may receive, wirelessly, from the second wireless device 122, a second indication of the power receiving state (e.g., the second percentage of battery charge 232) of the second wireless device. If the wireless power transfer device 106 determines that the respective power receiving state of the first and second wireless devices 120, 122 is at or below the threshold, then the available power 202 may be allocated into the first portion 204 and the second portion 206. When the controller 240 allocates the available power 202 into the first portion 204, the controller 240 may tune the first power transfer device transmitter 220 to match the first frequency 210 of the first wireless device 120. When the controller 240 allocates the available power 202 into the second portion 206, the controller 240 may tune the second power transfer device transmitter 222 to match the second frequency 212 of the second wireless device 122. The controller 240 may cause the first power transfer device transmitter 220 to transmit the first portion 204 to the first wireless device 120 and may cause the second power transfer device transmitter 222 to transmit the second portion 206 to the second wireless device 122.

Figure 5:
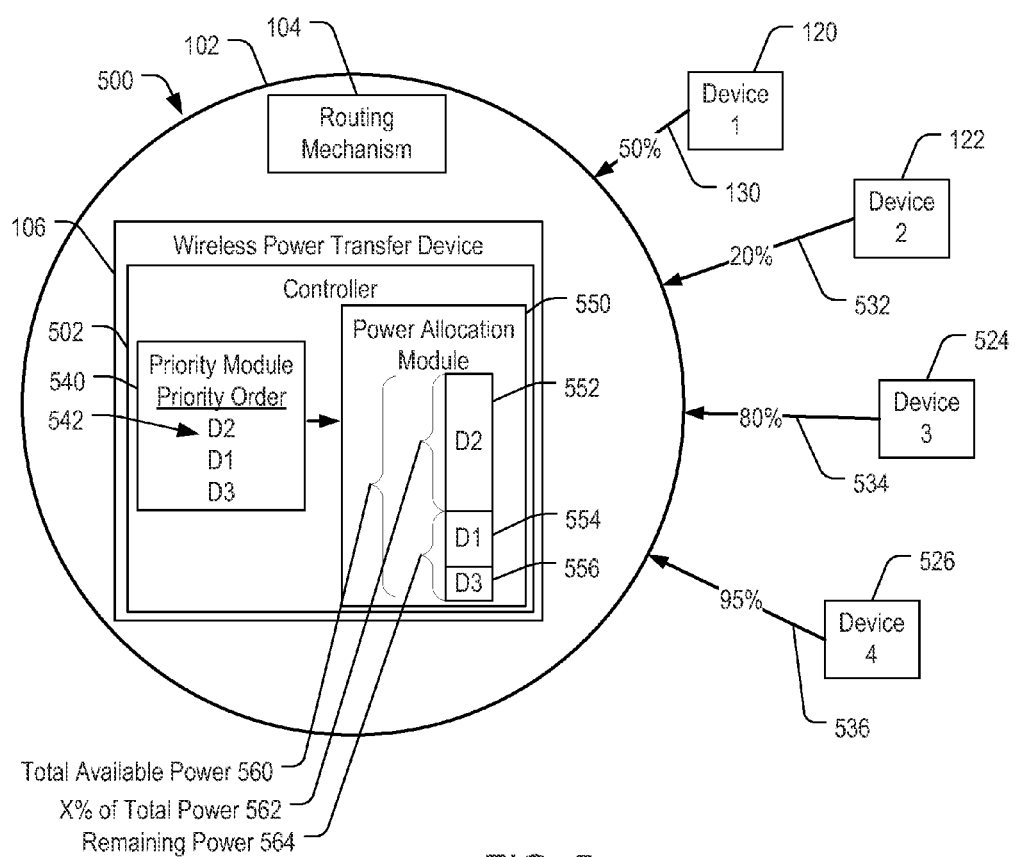
FIG. 5 is a block diagram of a first illustrative embodiment of a system including a power transfer device configured to apply a cascading charging mechanism to allocate wirelessly transmitted power to one or more wireless devices.

For example, allocation of the available power 202 into the first portion 204 and the second portion 206 may be enabled by applying a cascading charging mechanism, such as described in further detail with respect to FIG. 5. For example, the cascading charging mechanism may identify a priority order of charging of each of one or more wireless devices. For example, the priority order of charging may be identified based on a power receiving state of a particular device, a particular device having a higher default priority, a user defined priority, and/or on one or more other priority factors. Based on the priority order, the cascading charging mechanism may select a highest priority wireless device, determine an amount of remaining power, and assign a percentage of the remaining power to the highest priority wireless device. The cascading charging mechanism may thereafter select a next highest priority wireless device, determine the amount of remaining power, and assign another percentage of the remaining power to the next highest priority wireless device. The other percentage of the remaining power may be the same as the percentage of the remaining power assigned to the highest priority wireless device. Alternatively, the other percentage of the remaining power may be different than the percentage of the remaining power assigned to the highest priority wireless device. The cascading charging mechanism may thereafter select a lowest priority wireless device and assign any power remaining to the lowest priority wireless device.

Enabling one or more wireless devices to wirelessly charge from a power transfer device by allocating available power of the power transfer device among the one or more wireless devices while enabling the one or more wireless devices to concurrently communicate data to and/or receive data from a network drive via a routing mechanism enables data to be synchronized between the network drive and a particular device and/or among multiple devices while the multiple devices are charging, may enhance a user experience of a user of one or more of the wireless devices.

Figure 3:
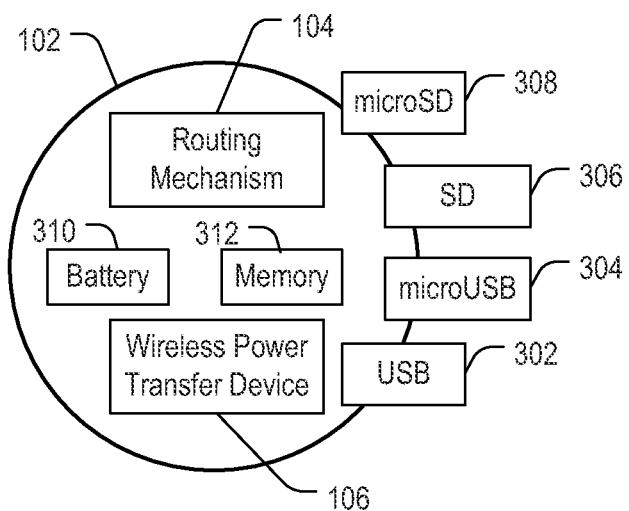
FIG. 3 is a block diagram of a second illustrative embodiment of a system including the power transfer device and the routing mechanism of FIG. 1.

FIG. 3 illustrates a particular embodiment of components of the apparatus 102 of FIG. 1. The apparatus 102 may include a universal serial bus (USB) interface 302. For example, the USB interface 302 may include a universal serial bus connector. The USB interface 302 may facilitate charging of an electronic device that does not have wireless charging capability by allowing the electronic device that does not have wireless charging capability to connect, via the USB interface 302, to the apparatus 102. In addition, or in the alternative, the USB interface 302 may facilitate connection of the apparatus 102 to another device, such as the network drive 108 of FIG. 1, to external storage, to another device, to an alternating current charging unit that is plugged into a standard electrical wall outlet, or any combination thereof.

Alternatively, or in addition, the apparatus 102 may include a micro-USB interface 304. For example, the micro-USB interface 304 may include a micro-USB connector. The micro-USB interface 304 may facilitate charging of an electronic device that does not have wireless charging capability by allowing the electronic device that does not have wireless charging capability to connect, via the micro-USB interface 304, to the apparatus 102. In addition, or in the alternative, the micro-USB interface 304 may facilitate connection of the apparatus 102 to another device, such as the network drive 108 of FIG. 1, to external storage, to another device, to an alternating current charging unit that is plugged into a standard electrical wall outlet, or any combination thereof.

Alternatively, or in addition, the apparatus 102 may include an interface 306 that is compliant with a standard for a secure digital (SD) flash memory card. The interface 306 may include a receptacle or slot configured to receive an SD flash memory card. The interface 306 may facilitate transfer of data to and from the SD flash memory card. The SD flash memory card may be the network drive 108 of FIG. 1.

Alternatively, or in addition, the apparatus 102 may include an interface 308 that is compliant with a standard for a microSD flash memory card. The interface 308 may include a receptacle or slot configured to receive a microSD flash memory card. The interface 308 may facilitate transfer of data to and from the microSD flash memory card. The microSD flash memory card may be the network drive 108 of FIG. 1.

Alternatively, or in addition, the apparatus 102 may include a battery 310. The battery 310 may be configured to provide power to the wireless power transfer device 106 in the event that the apparatus 102 is not plugged into or is not receiving power from a standard electrical wall outlet. The battery 310 may include a rechargeable battery or may include a non-rechargeable battery.

Alternatively, or in addition, the apparatus 102 may include a memory 312 configured to store data. The memory 312 may include a non-volatile memory of a flash device, such as a NAND flash device, a NOR flash device, or any other type of flash device.

Although the USB interface 302, the micro-USB interface 304, the interface 306 that is compliant with a standard for a SD flash memory card, and the interface 308 that is compliant with a standard for a microSD flash memory card are shown, the apparatus 102 may include other types of interfaces and/or fewer or more interfaces of each type.

A wireless power transfer device having one or more interfaces, such as a USB interface, a micro-USB interface, an interface that is compliant with a standard for a SD flash memory card, an interface that is compliant with a standard for a microSD flash memory card, and/or other types of interfaces, enables one or more wireless devices to wirelessly charge while enabling the one or more wireless devices to concurrently communicate data to and/or receive data from a network drive that is coupled to the wireless power transfer device via a routing mechanism. The routing mechanism enables data to be synchronized between the network drive and a particular device and/or among multiple devices while the multiple devices are charging, which may enhance a user experience of a user of one or more of the wireless devices.

Figure 4:
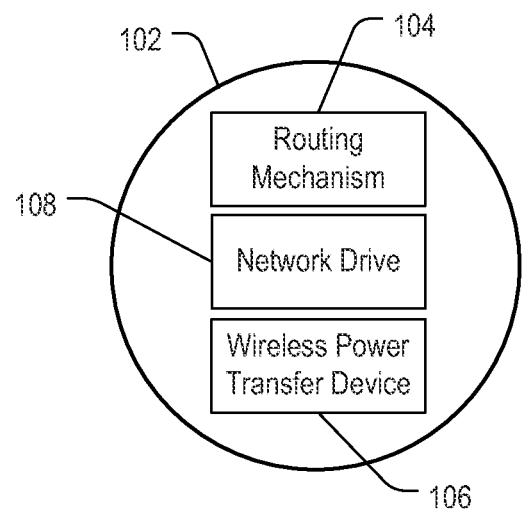
FIG. 4 is a block diagram of a third illustrative embodiment of a system including the power transfer device and the routing mechanism of FIG. 1, and further including an internal network drive.

FIG. 4 illustrates a particular embodiment of components of the apparatus 102 of FIG. 1. The apparatus 102 includes the routing mechanism 104 and the wireless power transfer device 106. As illustrated, the network drive 108 is included as part of the apparatus 102, such as within a common housing as the routing mechanism 104 and the wireless power transfer device 106.

Referring to FIG. 5, a particular illustrative embodiment of a system to wirelessly transfer power to one or more wireless devices is depicted and generally designated 500. The system 500 includes the routing mechanism 104 and the wireless power transfer device 106. The first and second wireless devices 120, 122 are each wirelessly coupled to the apparatus 102 via the routing mechanism 104, and are also each wirelessly coupled to the apparatus 102 via the wireless power transfer device 106. Similarly, a third wireless device 524 and a fourth wireless device 526 are each wirelessly coupled to the apparatus 102 via the routing mechanism 104, and are also each wirelessly coupled to the apparatus 102 via the wireless power transfer device 106. Although the system 500 is illustrated as including the first, the second, the third, and the fourth wireless devices 120, 122, 524, and 526, in other implementations, the system 500 may include fewer than four wireless devices or more than four wireless devices.

The wireless power transfer device 106 is configured to receive, wirelessly, from each particular device of a plurality of wireless devices, an indication of a power receiving state of the particular device and to determine whether the power receiving state of the particular device is at or below a threshold. For example, the wireless power transfer device 106 is configured to receive, wirelessly, from the first wireless device 120, the indication 130 of a power receiving state of the first wireless device 120 and to determine whether the power receiving state of the first wireless device 120 is at or below a threshold. Similarly, the wireless power transfer device 106 is configured to receive, wirelessly, from the second wireless device 122, an indication 532 of a power receiving state of the second wireless device 122 and to determine whether the power receiving state of the second wireless device 122 is at or below the threshold. Likewise, the wireless power transfer device 106 is configured to receive, wirelessly, from the third wireless device 524, an indication 534 of a power receiving state of the third wireless device 524 and to determine whether the power receiving state of the third wireless device 524 is at or below the threshold. In the same manner, the wireless power transfer device 106 is configured to receive, wirelessly, from the fourth wireless device 526, an indication 536 of the power receiving state of the fourth wireless device 526 and to determine whether the power receiving state of the fourth wireless device 526 is at or below the threshold.

The wireless power transfer device 106 includes a controller 502. The controller 502 may be the controller 240 of FIG. 2. The controller 502 is configured to be coupled to a transmitter (not shown) that includes one or more power transfer device transmitters such as the first power transfer device transmitter 220 and the second power transfer device transmitter 222 described above with respect to FIG. 2.

The controller 502 includes a priority module 540 and a power allocation module 550. The priority module 540 is illustrated as including a priority order 542 of charging of each of the one or more wireless devices. For example, the controller 502 may be configured to cause the priority module 540 to compare each of the received indications 130, 532, 534, and 536 to the threshold and to identify one or more of the devices having an indication at or below the threshold. The priority module 540 may determine the priority order 542 of charging of each of the one or more wireless devices.

The controller 502 may be configured to cause the power allocation module 550 to apply a cascading charging mechanism to allocate wirelessly transmitted power to the one or more wireless devices. For example, the controller 502 may cause the power allocation module 550 to, in response to the power receiving state of one or more wireless devices of the plurality of wireless devices being at or below the threshold, apply a cascading charging mechanism to allocate wirelessly transmitted power to the one or more wireless devices. During application of the cascading charging mechanism, the controller 502 may be configured to cause the priority module 540 to identify the priority order 542 of charging of each of the one or more wireless devices. The controller 502 may further be configured to cause the power allocation module 550 to repeat, according to the priority order 542, for each particular device of the one or more wireless devices (other than a lowest-priority wireless device), determining an amount of remaining power available for wireless transfer, and assigning to the particular device a portion of the remaining power, where the lowest-priority wireless device is assigned a remaining portion of available power. The lowest-priority wireless device may receive a least amount of power of the one or more wireless devices in the priority order 542, including receiving no power.

For example, as described above with respect to FIG. 1, the power receiving state may include a percentage of battery charge and the threshold may correspond to a value of the percentage of battery charge. To illustrate, the threshold may correspond to a 90% battery charge level. Although a threshold amount of 90% is used as an illustrative example, in other implementations the threshold amount may be less than 90% or may be greater than 90%.

As an illustrative example, the value of the percentage of battery charge of the first wireless device 120 may be 50%, the value of the percentage of battery charge of the second wireless device 122 may be 20%, the value of the percentage of battery charge of the third wireless device 524 may be 80%, and the value of the percentage of battery charge of the fourth wireless device 526 may be 95%. Accordingly, the power receiving state of each of the first wireless device 120, the second wireless device 122, and the third wireless device 524 is at or below the threshold amount (e.g., 90%), and the power receiving state of the fourth wireless device 526 is above the threshold amount. As such, the controller 502 may apply the cascading charging mechanism to the first, second, and third wireless devices 120, 122, 524 and may not apply the cascading charging mechanism to the fourth wireless device 526.

The priority order 542 of charging may be identified based at least in part on the indication, e.g., based on the percentage of battery charge of each device. For example, a device having a lowest percentage of battery charge may be identified as having a highest priority and a device having a highest percentage of battery charge may be identified as having a lowest priority. To illustrate, the priority order 542 of charging may include the second wireless device 122 (e.g., D2) having the highest priority, the first wireless device 120 (e.g., D1) having a next highest priority, and the third wireless device 524 (e.g., D3) having the lowest priority based upon the percentage of battery charge for each of the first, second, and third wireless devices 120, 122, 524. As shown, the priority order 542 may be illustrated as D2, D1, and D3.

After the priority order 542 of charging is determined, the controller 502 may be configured to cause the power allocation module 550 to iteratively: (1) determine an amount of remaining power available for wireless transfer for each particular device of the one or more wireless devices other than the lowest-priority wireless device, and (2) assign to the particular device a portion of the remaining power. After assigning portions of available power to higher priority devices, the controller 502 may cause the power allocation module 550 to assign a remaining portion of available power to the lowest-priority wireless device. For example, the controller 502 may be configured to cause the power allocation module 550 to determine an amount of remaining power available for wireless transfer for D2 (e.g., the highest priority device) and assign a percentage of the total power available to D2. The assigned percentage of the total available power may be a design parameter or may be user defined.

After assigning the portion of the remaining power available to D2, the controller 502 may be configured to cause the power allocation module 550 to repeat the determination of the amount of remaining power available for wireless transfer for D1 (e.g., the next highest-priority device) and assign another percentage of the remaining power available to D1. The amount of remaining power available may be determined by subtracting power assigned to each higher-priority wireless devices from a total power available. The other percentage of the remaining power available assigned to D1 may be the same percentage as the percentage of the remaining power available assigned to D2. Alternatively, the other percentage of the remaining power available assigned to D1 may be a different percentage than the percentage of the remaining power available assigned to D2. In a particular implementation, the highest-priority wireless device (D2) may receive a largest percentage of total available power of the wireless power transfer device 106, the next highest-priority wireless device (D1) may receive a next largest percentage of the total available power of the wireless power transfer device 106, and so on. After assigning the other percentage of the remaining power available to D1, the controller 502 may be configured to cause the power allocation module 550 to assign a remaining portion of available power to the lowest-priority wireless device (e.g., D3). In a particular implementation, the lowest-priority wireless device (D3) may receive a smallest percentage of total available power of the wireless power transfer device 106.

The power allocation module 550 is illustrated as including a vertical bar for ease of explanation to graphically represent total power available 560 divided into portions corresponding to power allocation to mobile devices. The power allocation module 550 indicates that a largest portion 552 of the total power available 560 assigned to D2, a next-largest portion 554 of the total power available 560 assigned to D1, and a remaining portion 556 of the total power available 560 assigned to D3.

For example, based on the priority order 542, the cascading charging mechanism may select a highest priority wireless device (e.g., D2), determine an amount of remaining power available 564, and assign a percentage 562 of the remaining power available 564 to D2. The remaining power available 564 may be determined by subtracting power assigned to each higher-priority wireless devices from the total power available 560. Because D2 is the highest priority device, the remaining power available 564 for D2 may be 100% of the total power available 560. For purposes of illustration, the percentage 562 assigned to D2 may be 60% of the total power available 560, such that the largest portion 552 of the total power available 560 is assigned to D2.

The cascading charging mechanism may thereafter select a next highest priority wireless device (e.g., D1), determine the amount of remaining power available 564, and assign the percentage 562 (i.e., 60% in the example above) of the remaining power available 564 to D1. The remaining power available 564 for D1 may be determined by subtracting the portion 552 (e.g., 60%) of the total power available 560 assigned to D2 from the total power available 560 (e.g., 100%−60%=40% of the total power available 560 remaining for D1). D1 may be assigned 60% of the remaining 40% of the total power available 560 (e.g., 24% of the total power available 560) such that the next-largest portion 554 of the total power available 560 is assigned to D1.

The cascading charging mechanism may thereafter select a next highest priority wireless device (e.g., D3, which is a lowest-priority wireless device) and assign a remaining portion of available power to D3. The remaining portion of available power for D3 may be determined by subtracting the portion 552 assigned to D2 from the total power available 560 and by subtracting the portion 554 assigned to D1 from the total power available 560, such that the remaining portion 556 of the total power available 560 is assigned to D3 (e.g., 100%−60%−24%=16% of the total power available 560 as the remaining portion).

Although the percentage 562 assigned to a particular wireless device is illustrated as being 60%, in other implementations, the percentage 562 may be less than 60% or may be greater than 60%. Further, although the cascading charging mechanism is illustrated as being applied to three wireless devices for illustration purposes, the cascading charging mechanism may be applied to less than three wireless devices or to more than three wireless devices.

During operation, the wireless power transfer device 106 may receive, wirelessly, from each of the first, second, third, and fourth wireless devices 120, 122, 524, and 526, a respective indication 130, 532, 534, and 536, of a respective power receiving state and may determine whether a respective power receiving state is at or below the threshold. In response to the power receiving state of the first, second, and third wireless devices 120, 122, and 524 being at or below the threshold, the controller 502 may cause the power allocation module 550 to apply a cascading charging mechanism to allocate wirelessly transmitted power to the first, second, and third wireless devices 120, 122, and 524.

During application of the cascading charging mechanism, the controller 502 may cause the priority module 540 to identify the priority order 542 of charging of each of the first, second, and third wireless devices 120, 122, and 524 (e.g., D2, D1, D3). The controller 502 may cause the power allocation module 550 to repeat, according to the priority order 542, for each of D2 and D1, determining an amount of remaining power available 564 for wireless transfer for the particular device, and assigning to the particular device a portion 562 of the remaining power available 564. The controller 502 may cause the power allocation module 550 to assign a remaining portion of available power to the lowest-priority wireless device (e.g., D3).

For example, because D2 is the highest priority device, the remaining power available 564 for D2 may be 100% of the total power available 560. The percentage 562 assigned to D2 may be 60% of the remaining power available 564, such that the largest portion 552 (e.g., 60%) of the total power available 560 is assigned to D2. The remaining power available 564 for D1 may be determined by subtracting the portion 552 (e.g., 60%) of the total power available 560 assigned to D2 from the total power available 560 (e.g., 100%−60%=40% of the total power available 560 remaining for D1). D1 may be assigned 60% of the remaining 40% of the total power available 560 (e.g., 24% of the total power available 560) such that the next-largest portion 554 of the total power available 560 is assigned to D1. The remaining portion of available power for D3 may be determined by subtracting the portion 552 assigned to D2 from the total power available 560 and by subtracting the portion 554 assigned to D1 from the total power available 560, such that the remaining portion 556 of the total power available 560 is assigned to D3 (e.g., 100%−60%−24%=16% of the total power available 560 as the remaining portion).

Although the particular embodiment described above with respect to FIG. 5 has been described as having the priority order 542 being based on the power receiving state for ease of explanation, in other implementations, the priority order 542 may be based on factors independent of the power receiving state. For example, in addition or alternatively to the power receiving state, one or more other priority factors may be considered. For example, a phone or a medical device may have a higher default priority or a higher weighting to the priority order 542 than an audio player or a tablet device. For example, the indications received may include a priority of the device or a priority requested by the device. As another example, the indications received may include a user defined priority or priority weighting.

By selecting devices in order of priority and assigning a percentage of the remaining available power to each device according to its position in the priority order, all available power of the wireless power transfer device 106 may be allocated to the respective devices in proportions corresponding to relative amounts of wireless power transfer needed by the devices.

Figure 6:
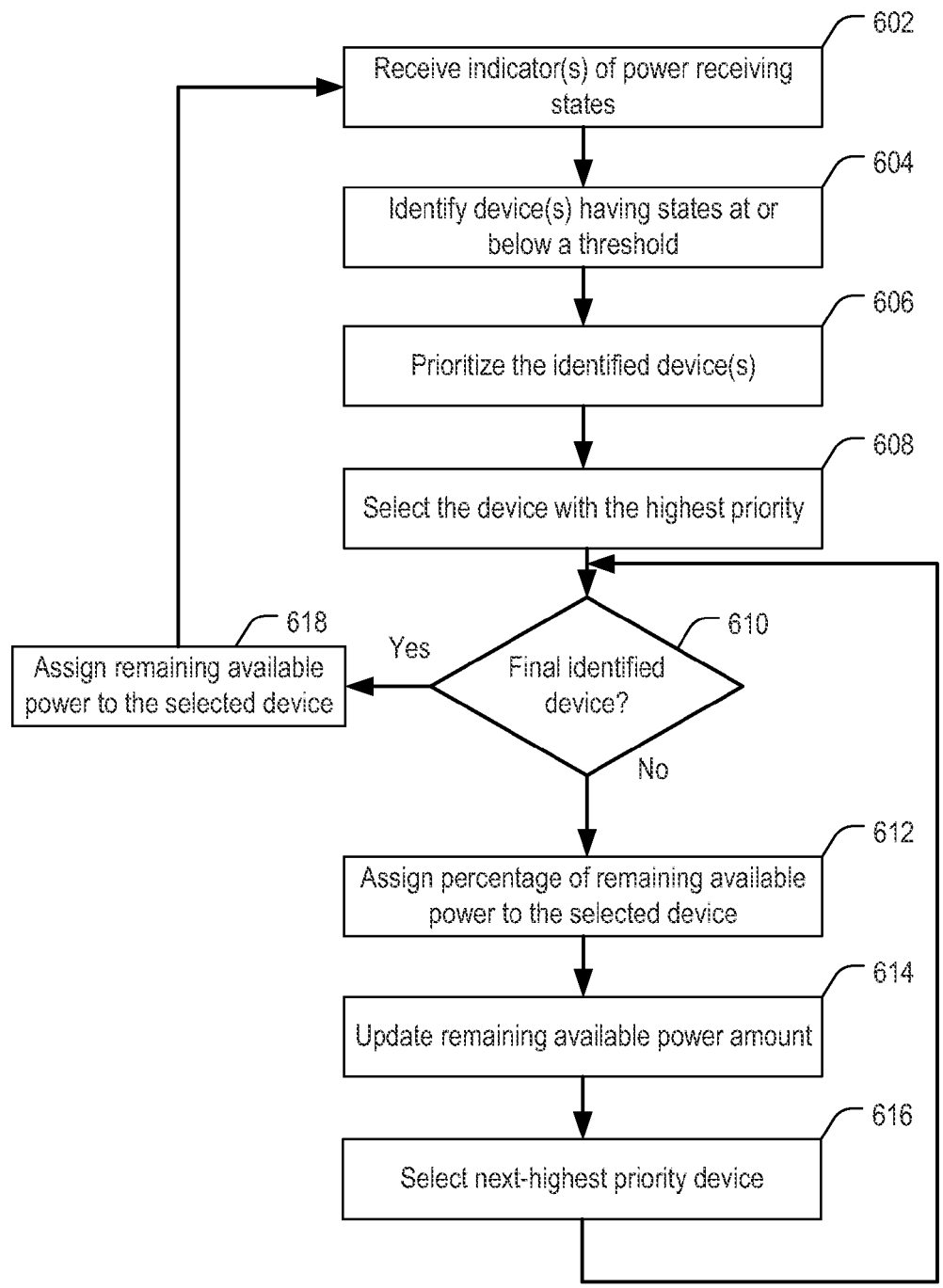
FIG. 6 is a flow chart illustrating a particular embodiment of a method of applying a cascading charging mechanism to allocate wirelessly transmitted power to one or more wireless devices.

Referring to FIG. 6, a flowchart of an illustrative embodiment of a cascading charging mechanism is illustrated. For example, the cascading charging mechanism may be applied by the wireless power transfer device 106 of FIGS. 1-5 and 7. The cascading charging mechanism may include receiving one or more indicators of power receiving states corresponding to wireless devices, at 602. For example, the indicators of power receiving states may include an indication of a percentage of battery charge, such as the percentage of battery charges 230, 232, illustrated in FIG. 2.

One or more devices having states at or below a threshold may be determined, at 604. For example, a threshold may correspond to a percentage of battery charge of a wireless device, and each indicator received from each wireless device may be compared to the threshold. In response to determining that an indicator is above a threshold, the corresponding wireless device may not be selected for receipt of wireless power transfer. In response to determining one or more devices having a percentage of battery charge at or below the threshold, a priority of providing wireless power transfer to such devices may be determined, at 606.

For example, one or more devices identified as having wireless power receiving states at or below the threshold may be ordered according to a priority order, where a lowest percentage of battery charge may be determined as having a highest priority, while a highest percentage of battery charge may be determined as having a lowest priority. For example, the priority order may be determined based on percentage of battery charge or based on other factors as described with respect to the priority order 542 of FIG. 5.

A device determined to have the highest priority of the identified devices may be selected, at 608. A determination may be made whether the selected device is a final identified device, at 610. To illustrate, the determination may include determining whether the selected device is the lowest-priority device of the one or more devices identified at 604. In response to a determination that the selected device is not the final identified device, at 610, a percentage of remaining available power may be assigned to the selected device, at 612. For example, the percentage of remaining available power for a highest priority device may correspond to a percentage of total power of the wireless power transfer device. For example, the second device 122 of FIG. 5 is illustrated as having a highest priority of the devices 120, 122, and 524 and may be assigned the percentage 562 of total power in response to the power remaining being equal to the total power available 560. As an example, the percentage may correspond to 60%, as described with respect to FIG. 5.

A remaining available power amount may be updated, at 614. For example, referring to FIG. 5, after allocating the percentage of total power 562 to the highest priority device (the second device 122), a determination may be made that a remaining power 564 is available to be allocated between the remaining devices that are identified at 604. For example, when the selected device is the highest priority device, a remaining available power amount may be equal to a total power minus an amount of power allocated to the highest priority device, at 612.

After assigning a percentage of remaining available power to the selected device, at 612, and updating an amount of remaining available power, at 614, a next highest priority device may be selected, at 616, and processing may return to the determination of whether the selected device is a final identified device, at 610.

In response to determining that the selected device is the final identified device, at 610, remaining available power may be assigned to the selected device, at 618. After assigning the remaining available power to the selected device, at 618, processing may return to 602, where one or more indicators of power receiving states may be received from wireless devices.

By selecting devices in order of priority and assigning a percentage of the remaining available power to each device according to its position in the priority order, all available power of the wireless power transfer device may be allocated to the respective devices in proportions corresponding to a relative amount of wireless power transfer needed by the devices.

Although the wireless power transfer device 106 is described with respect to FIGS. 5 and 6 as being configured to apply the cascading charging mechanism in response to one or more of the power receiving states being at or below the threshold for ease of explanation, in an alternate implementation, the threshold may be satisfied if the power receiving state is at or above the threshold. Alternatively, or in addition, the threshold may be satisfied if the power receiving state is below the threshold, or if the power receiving state is above the threshold.

Figure 7:
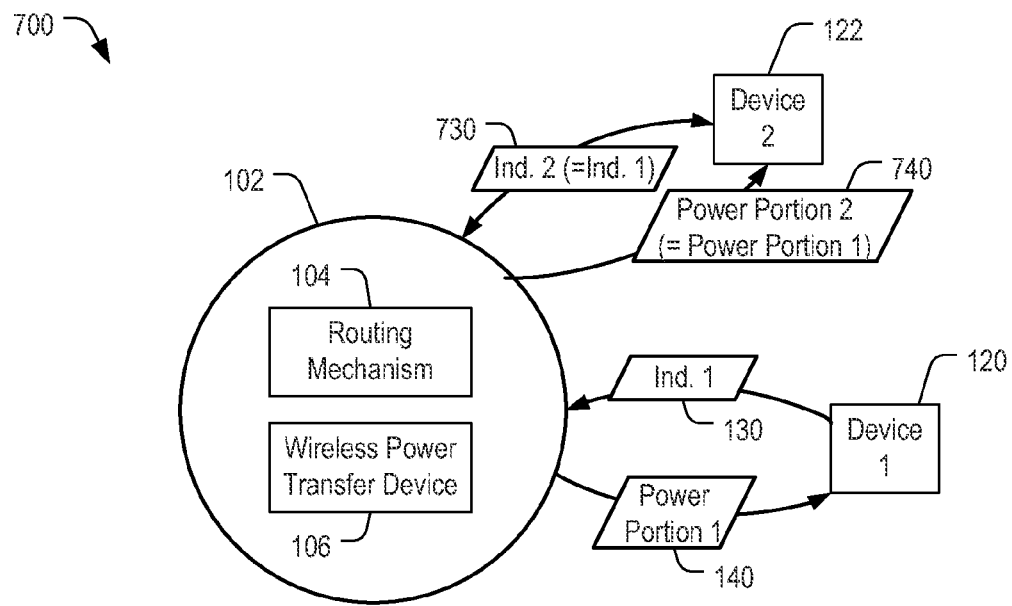
FIG. 7 is a block diagram of a second illustrative embodiment of a system including a power transfer device configured to apply a cascading charging mechanism to allocate wirelessly transmitted power to one or more wireless devices.

FIG. 7 illustrates another illustrative embodiment of a system 700 including the apparatus 102 of FIG. 1 wirelessly coupled to the first device 120 and the second device 122. The system 700 illustrates an example of application of a cascading charging mechanism responsive to multiple wireless devices providing indications of equal power receiving states, such as equal amounts or percentages of battery charge.

To illustrate, the first device 120 may send an indication 130 including a particular percentage of battery charge at the first device 120. Similarly, the second device 122 may send a second indication 730 indicating another percentage of battery charge as indicated by the first device 120. In response to the indication 130 and the second indication 730 both indicating a same amount of remaining battery charge, the wireless power transfer device 106 may be configured to provide substantially equal portions of wirelessly transmitted power to the first device 120 and to the second device 122. For example, the wireless power transfer device 106 may transfer a first portion of available power 140 to the first device 120 and a second portion of available power 740 that equals the first portion of available power 140 to the second device 122. In this manner, the wireless power transfer device 106 may provide substantially equal portions of power to devices indicating substantially equal wireless power receiving states.

The wireless power transfer device 106 may operate in a substantially similar manner as the cascading charging mechanism illustrated in FIG. 6, with a modification such that devices having equal priority, such as the first device 120 and the second device 122 of FIG. 7, may be concurrently selected and a percentage of the remaining available power may be provided to the devices in equal amounts. For example, if the percentage of available remaining power to be provided to the devices is 60%, the first device 120 and the second device 122 may be determined to occupy two adjacent positions in a priority order (although having equal priority) and a total percentage of remaining available power assigned to the first and second devices 120 and 122 may be equal to a total power that would be allocated to two devices having different priority.

For example, 60% of remaining available power and also 60% of power remaining after the first 60% (i.e., 60% of 40% equals 24%), may be allocated to the first and second devices 120 and 122, totaling 84% of available remaining power that may be allocated to the first and second devices 120, 122 having equal priority. The total allocated amount (e.g., 84%) may be substantially equally divided into power allocations to the devices having equal priority. In this example, the 84% total power allocation to be provided to the first and second devices 120, 122 may be divided substantially in half such that approximately 42% of remaining available power may be allocated to each of the first and second devices 120, 122. Other devices having lower priority (not illustrated in FIG. 7) may then receive percentages of remaining available power as illustrated at 608-618 of FIG. 6.

Figure 8:
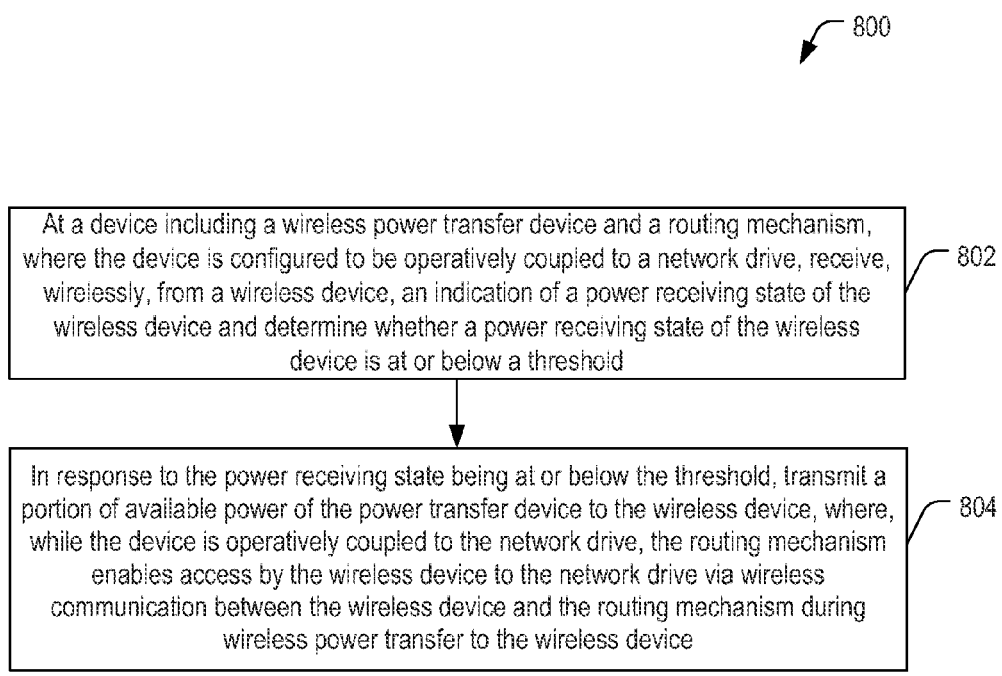
FIG. 8 is a flow chart illustrating a particular embodiment of a method of transmitting a portion of available power of a power transfer device to a wireless device and enabling wireless access by the wireless device to a network drive.

Referring to FIG. 8, a flowchart of an illustrative embodiment of a method 800 of transmitting a portion of available power of a power transfer device to a wireless device and enabling wireless access by the wireless device to a network drive is illustrated. The method 800 may be performed at a device including a wireless power transfer device and a routing mechanism, where the device is configured to be operatively coupled to the network drive. For example, the device may be the apparatus 102 of FIGS. 1, 3-5, and 7, the wireless power transfer device may be the wireless power transfer device 106 of FIGS. 1-5 and 7, the routing mechanism may be the routing mechanism 104 of FIGS. 1, 3-5, and 7, the network drive may be the network drive 108 of FIGS. 1 and 4, and the wireless device may be one or more of the first and second wireless devices 120, 122 of FIGS. 1, 2, 5, and 7, and the third and fourth wireless devices 524, 526 of FIG. 5.

The method 800 includes receiving, wirelessly, from a wireless device, an indication of a power receiving state of the wireless device and determining whether the power receiving state of the wireless device is at or below a threshold, at 802. For example, the wireless power transfer device 106 may receive, wirelessly, from the first wireless device 120, the indication 130 of a power receiving state of the first wireless device 120 and may determine whether the power receiving state of the first wireless device 120 is at or below a threshold. The indication 130 may include an indication of a percentage of battery charge, such as the percentage of battery charge 230 illustrated in FIG. 2, and the threshold may correspond to a value of the percentage of battery charge of the first wireless device 120.

In response to the power receiving state being at or below the threshold, a portion of available power of the power transfer device may be transmitted to the wireless device, at 804. For example, if the value of the percentage of battery charge of the first wireless device 120 is at or below the threshold, the wireless power transfer device 106 may transmit the first portion 204 of the available power 202 of FIG. 2 to the first wireless device 120. If the value of the percentage of battery charge of the first wireless device 120 is above the threshold amount, the wireless power transfer device 106 may not transmit the first portion 204 of the available power 202 to the first wireless device 120.

While the device is operatively coupled to the network drive, the routing mechanism may enable access by the wireless device to the network drive via wireless communication between the wireless device and the routing mechanism during wireless power transfer to the wireless device. For example, while the apparatus 102 is operatively coupled to the network drive 108, the routing mechanism 104 may enable access by the first wireless device 120 to the network drive 108 via wireless communication between the first wireless device 120 and the routing mechanism 104 during wireless power transfer from the wireless power transfer device 106 to the first wireless device 120.

Transmission of the portion of the available power 202 of the wireless power transfer device 106 of FIG. 2 may include allocating the available power 202 into portions of available power to enable wireless power transfer to the first wireless device 120 and to the second wireless device 122 while the first wireless device 120 and/or the second wireless device 122 accesses the network drive 108. For example, the available power 202 may be allocated into the first portion 204 and into the second portion 206 if the power receiving state (e.g., the first percentage of battery charge 230) of the first wireless device 120 is at or below the threshold and if the power receiving state (e.g., the second percentage of battery charge 232) of the second wireless device 122 is at or below the threshold.

Allocating the available power 202 into the first portion 204 may include tuning the first power transfer device transmitter 220 to match a first resonant frequency 210 of the first wireless device 120. Similarly, allocating the available power 202 into the second portion 206 may include tuning the second power transfer device transmitter 222 to match a second resonant frequency 212 of the second wireless device 122. The first power transfer device transmitter 220 may transmit the first portion 204 to the first wireless device 120, and the second power transfer device transmitter 222 may transmit the second portion 206 to the second wireless device 122.

Enabling one or more wireless devices to wirelessly charge from a power transfer device while enabling the one or more wireless devices to concurrently communicate data to and/or receive data from a network drive via a routing mechanism enables data to be synchronized between the network drive and a particular device and/or among multiple devices while the multiple devices are charging, may enhance a user experience of a user of one or more of the wireless devices.

Figure 9:
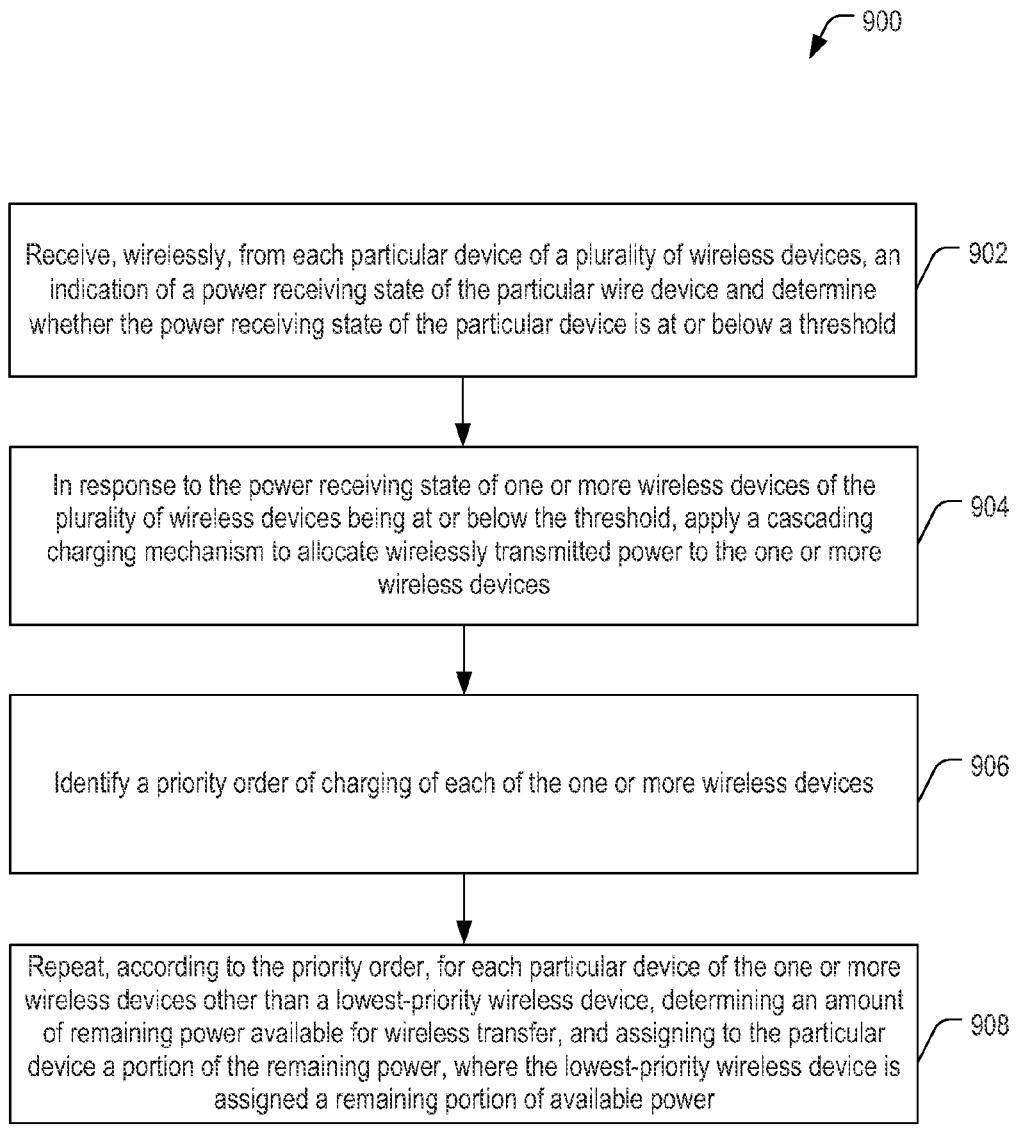
FIG. 9 is a flow chart illustrating a second illustrative embodiment of a method of applying a cascading charging mechanism to allocate wirelessly transmitted power to one or more wireless devices.

FIG. 9 is a flow diagram illustrating a second illustrative embodiment of a method 900 of applying a cascading charging mechanism to allocate wirelessly transmitted power to one or more wireless devices. For example, the cascading charging mechanism may be applied by the wireless power transfer device 106 of FIGS. 1-5 and 7. The cascading charging mechanism may include receiving, wirelessly, from each particular device of a plurality of wireless devices, an indication of a power receiving state of the particular wireless device and may determine whether the power receiving state of the particular device is at or below a threshold, at 902. For example, the wireless power transfer device 106 illustrated in FIG. 5 may receive, wirelessly, from each of the first, second, third, and fourth wireless devices 120, 122, 524, and 526, a respective indication 130, 532, 534, and 536, of a respective power receiving state of the particular wireless device and may determine whether the respective power receiving state is at or below the threshold. Each of the respective indications 130, 532, 534, and 536, may include an indication of a percentage of battery charge, such as the percentage of battery charges 230, 232 illustrated in FIG. 2, and the threshold may correspond to a value of the percentage of battery charge of a wireless device.

In response to the power receiving state of one or more wireless devices of the plurality of wireless devices being at or below the threshold, the cascading charging mechanism may be applied to allocate wirelessly transmitted power to the one or more wireless devices, at 904. For example, in response to the power receiving state of the first, second, and third wireless devices 120, 122, and 524 being at or below the threshold, the cascading charging mechanism may be applied to allocate wirelessly transmitted power to the first, second, and third wireless devices 120, 122, and 524.

Applying the cascading charging mechanism may include identifying a priority order of charging of each of the one or more wireless devices, at 906. For example, one or more devices identified as having wireless power receiving states at or below the threshold may be ordered according to a priority order, where a lowest percentage of battery charge may be determined as having a highest priority, while a highest percentage of battery charge may be determined as having a lowest priority. For example, the priority order may be determined as described with respect to the priority order 542 of FIG. 5 (e.g., D2, D1, and D3).

Applying the cascading charging mechanism may include repeating, according to the priority order, for each particular device of the one or more wireless devices other than a lowest-priority wireless device, determining an amount of remaining power available for wireless transfer, and assigning to the particular device a portion of the remaining power, at 908. The lowest-priority wireless device may be assigned a remaining portion of available power. For example, applying the cascading charging mechanism may include repeating, according to the priority order 542 of FIG. 5, for each of D2 and D1, determining the amount of remaining power available 564 for wireless transfer for a particular device, and assigning to the particular device the portion 562 of the remaining power available 564. Thereafter, the remaining portion of available power may be assigned to the lowest-priority wireless device (e.g., D3).

For example, with reference to FIG. 5, the amount of remaining power available 564 for wireless transfer to a particular wireless device may be determined by subtracting power assigned to each higher-priority wireless devices from the total power available 560 for wireless transfer. To illustrate, because D2 is the highest priority device in this example, the remaining power available 564 for D2 may be 100% of the total power available 560. The remaining power available 564 for D1 may be determined by subtracting the portion 552 (e.g., 60%) of the total power available 560 assigned to D2 from the total power available 560 (e.g., 100%–60%=40% of the total power available 560 remaining for D1). D1 may be assigned 60% of the remaining 40% of the total power available 560 (e.g., 60% of 40% equals 24% of the total power available 560) such that the next-largest portion 554 of the total power available 560 is assigned to D1.

The remaining portion of available power for wireless transfer to the lowest-priority wireless device may be determined by subtracting power assigned to each higher-priority wireless devices from the total power available for wireless transfer. To illustrate, the remaining portion of available power for the lowest-priority wireless device (e.g., D3) may be determined by subtracting the portion 552 assigned to D2 from the total power available 560 and by subtracting the portion 554 assigned to D1 from the total power available 560. In this example, the remaining portion 556 of the total power available 560 assigned to D3 may equal 16% of the total power available 560 (e.g., 100%–60%–24%=16%).

Allocating wirelessly transmitted power to a particular wireless device of the one or more wireless devices may include tuning a power transfer device transmitter to match a resonant frequency of the particular wireless device of the one or more wireless devices. For example, allocating the wirelessly transmitted power to the one or more devices may include tuning the first power transfer device transmitter 220 of FIG. 2 to match a first resonant frequency 210 of the first wireless device 120 and may include tuning the second power transfer device transmitter 222 to match a second resonant frequency 212 of the second wireless device 122.

By selecting devices in order of priority and assigning a percentage of the remaining available power to each device according to its position in the priority order, all available power of the wireless power transfer device may be allocated to the respective devices in proportions corresponding to an amount of wireless power transfer needed by the devices.

Although various components depicted herein are illustrated as block components and described in general terms, such components may include one or more microprocessors, state machines, or other circuits configured to enable the wireless power transfer device 106 of FIGS. 1-5 and 7 to perform the particular functions attributed to such components, or any combination thereof. For example, the wireless power transfer device 106 may represent physical components, such as hardware controllers, state machines, logic circuits, or other structures to enable the wireless power transfer device 106 to apply a cascading charging mechanism.

For example, the wireless power transfer device 106 may be implemented using a microprocessor or microcontroller programmed to apply the cascading charging mechanism. In a particular embodiment, the wireless power transfer device 106 includes executable instructions that are executed by a processor and the instructions are stored at the memory 312 of FIG. 3. Alternatively, or in addition, executable instructions that are executed by a processor that may be included in the wireless power transfer device 106 may be stored at a separate memory location that is not part of the memory 312, such as at a read-only memory (ROM) (not shown).

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method performed by a wireless power transfer device, the method comprising:
applying a cascading charging mechanism to allocate wirelessly transmitted power to one or more wireless devices, wherein applying the cascading charging mechanism comprises, performing:
determining that a percentage of battery charge of each of the one or more wireless devices is at or below a threshold;
identifying a priority order of charging of each of the one or more wireless devices, wherein a first priority order of a first wireless device of the one or more wireless devices is based on a first percentage of battery charge of the first wireless device; and
repeating, according to the priority order, for each particular wireless device of the one or more wireless devices other than a lowest-priority wireless device:
determining an amount of remaining power available for wireless transfer; and
assigning to the particular wireless device a portion of the remaining power,
wherein the lowest-priority wireless device is assigned a remaining portion of available power.

2. The method of claim 1, further comprising:
receiving, wirelessly, from each particular wireless device of a plurality of wireless devices that includes the one or more wireless devices, an indication of a percentage of battery charge of the particular wireless device; and
determining whether the percentage of battery charge of the particular wireless device is at or below the threshold.

3. The method of claim 2, wherein the cascading charging mechanism is applied in response to determining that a first particular percentage of battery charge of a first particular wireless device of the plurality of wireless devices is at or below the threshold and that a second particular percentage of battery charge of a second particular wireless device of the plurality of wireless devices is at or below the threshold.

4. The method of claim 1, further comprising identifying an amount of total power available for wireless transfer to the one or more wireless devices.

5. The method of claim 4, wherein the remaining power available for wireless transfer to a particular wireless device is determined by subtracting power assigned to each higher-priority wireless device from the total power available for wireless transfer.

6. The method of claim 1, further comprising tuning a power transfer device transmitter to match a frequency of a particular wireless device of the one or more wireless devices to transmit power to the particular wireless device.

7. The method of claim 1, further comprising concurrently transmitting a first portion of power to a first particular wireless device of the one or more wireless devices and a second portion of power to a second particular wireless device of the one or more wireless devices, wherein the first portion of power assigned to the first particular wireless device is larger than the second portion of power assigned to the second particular wireless device.

8. The method of claim 1, further comprising transmitting power via magnetic resonance (MR).

9. The method of claim 1, wherein the portion of the remaining power corresponds to a particular percentage of the amount of the remaining power available for wireless transfer.

10. An apparatus comprising:
a power transfer device including:
a priority module configured to identify a priority order of charging of each of one or more wireless devices; and
a power allocation module configured to:
receive, from each device of a plurality of the wireless devices, an indication of a percentage of battery charge of the wireless device;
apply a cascading charging mechanism to allocate wirelessly transmitted power to the one or more wireless devices;
determine that the percentage of battery charge of at least one of the one or more wireless devices is at or below a threshold;
determine, for each particular wireless device of the one or more wireless devices other than a lowest-priority wireless device, an amount of remaining power available for wireless transfer;
assign to the particular wireless device a portion of the remaining power according to the priority order; and
assign a remaining portion of available power to the lowest-priority wireless device.

11. The apparatus of claim 10, wherein a first priority order of a first wireless device of the one or more wireless devices is based on a type of the first wireless device.

12. The apparatus of claim 11, wherein the cascading charging mechanism is applied in response to determining that a first particular percentage of battery charge of a first particular wireless device of the plurality of the wireless devices is at or below the threshold and that a second particular percentage of battery charge of a second particular wireless device of the plurality of the wireless devices is at or below the threshold.

13. The apparatus of claim 11, wherein the cascading charging mechanism is applied in response to determining that a first particular percentage of battery charge of a first particular wireless device of the plurality of the wireless devices is at or above the threshold and that a second particular percentage of battery charge of a second particular wireless device of the plurality of the wireless devices is at or above the threshold.

14. The apparatus of claim 10, wherein the power allocation module is further configured to identify an amount of total power available for wireless transfer to the one or more wireless devices.

15. The apparatus of claim 14, wherein the remaining power available for wireless transfer to a particular wireless device is determined by subtracting power assigned to each higher-priority wireless device from the total power available for wireless transfer.

16. The apparatus of claim 10, wherein the power allocation module is further configured to select each wireless device of the one or more wireless devices from the plurality of the wireless devices in response to determining that a first particular battery charge of the wireless device is at or below a threshold.

17. The apparatus of claim 10, wherein the power transfer device is configured to transmit power via magnetic resonance (MR).

18. The apparatus of claim 10, further comprising a transmitter configured to transmit power to the one or more wireless devices.

19. The apparatus of claim 18, wherein the power allocation module is further configured to tune the transmitter to match a frequency of a particular wireless device of the one or more wireless devices.

20. The apparatus of claim 10, wherein the portion of the remaining power corresponds to a particular percentage of the amount of the remaining power available for wireless transfer, wherein a first priority order of a first wireless device of the one or more wireless devices is based on a type of the first wireless device, and wherein the type of the first wireless device includes a medical device, a phone, an audio player, or a tablet device.

\* \* \* \* \*